United States Patent
Kanneganti et al.

(10) Patent No.: US 9,019,570 B1
(45) Date of Patent: Apr. 28, 2015

(54) SYSTEMS AND METHODS FOR COMPUTATIONALLY DISTINGUISHING HANDWRITTEN PENCIL MARKS FROM PREPRINTED MARKS IN A SCANNED DOCUMENT

(71) Applicants: McGraw-Hill School Education Holdings LLC, New York, NY (US); The Board of Trustees of Southern Illinois University, Carbondale, IL (US)

(72) Inventors: Raghuveer Kanneganti, Carbondale, IL (US); Randal B. Fry, Salinas, CA (US); Lalit Gupta, Carbondale, IL (US); Ahmed Freidoon Fadhil, Carbondale, IL (US)

(73) Assignees: McGraw-Hill School Education Holdings LLC, New York, NY (US); The Board of Trustees of Southern Illinois University, Carbondale, IL (US)

( * ) Notice: Subject to any disclaimer, the term of this patent is extended or adjusted under 35 U.S.C. 154(b) by 0 days.

(21) Appl. No.: 14/091,996

(22) Filed: Nov. 27, 2013

(51) Int. Cl.
*H04N 1/405* (2006.01)
*H04N 1/40* (2006.01)
*G06K 9/00* (2006.01)

(52) U.S. Cl.
CPC ........ *H04N 1/40062* (2013.01); *G06K 9/00422* (2013.01); *G06K 9/00456* (2013.01); *G06K 9/00483* (2013.01); *H04N 2201/0081* (2013.01); *H04N 2201/0416* (2013.01)

(58) Field of Classification Search
USPC ........... 358/2.1, 1.9, 462, 464, 448, 450, 453, 358/474, 500, 400
See application file for complete search history.

(56) References Cited

U.S. PATENT DOCUMENTS

| | | | |
|---|---|---|---|
| 4,907,096 A | 3/1990 | Stansfield et al. | |
| 5,239,390 A | 8/1993 | Tai | |
| 5,384,648 A | 1/1995 | Seidner et al. | |
| 5,404,294 A * | 4/1995 | Karnik | 715/236 |
| 5,619,592 A | 4/1997 | Bloomberg et al. | |
| 5,694,494 A | 12/1997 | Hart et al. | |
| 5,896,464 A | 4/1999 | Horiuchi et al. | |
| 6,035,058 A | 3/2000 | Savakis et al. | |
| 6,160,913 A | 12/2000 | Lee et al. | |

(Continued)

FOREIGN PATENT DOCUMENTS

WO WO 2008/077715 A2 7/2008
WO WO 2008/106004 A1 9/2008

*Primary Examiner* — Thomas D Lee
*Assistant Examiner* — Stephen M Brinich
(74) *Attorney, Agent, or Firm* — Rothwell, Figg, Ernst & Manbeck PC

(57) ABSTRACT

A method, system, and algorithm detects graphite responses in optical mark recognition documents using inexpensive visible-light scanners. The invention is invariant to the numerous background colors and artwork in typical optical mark recognition documents. A superposition of a graphite response image and a background image is modeled. The background image in turn is modeled as a superposition of screening, artwork, lines, and machine text components. A sequence of image processing operations and a pattern recognition algorithm is used to isolate the graphite response image from a test document by systematically removing the components of the background image. The image processing operations consist of grayscale and color segmentation and the application of the Hough transform. Components that are not removed by image processing operations are identified by calculating their texture features, and removed using a multivariate Gaussian classifier.

15 Claims, 10 Drawing Sheets

(56) References Cited

U.S. PATENT DOCUMENTS

| | | |
|---|---|---|
| 6,298,150 B1 | 10/2001 | Sonoda et al. |
| 6,330,357 B1 | 12/2001 | Elmenhurst et al. |
| 6,757,426 B2 | 6/2004 | Link et al. |
| 6,970,267 B1 | 11/2005 | Scanlon |
| 7,020,328 B2 | 3/2006 | Barton |
| 7,545,540 B2 | 6/2009 | Shiau |
| 7,573,616 B2 | 8/2009 | Poor |
| 7,853,074 B2 | 12/2010 | Mischler |
| 7,961,941 B2 | 6/2011 | Withum et al. |
| 2002/0154339 A1 | 10/2002 | Kuo et al. |
| 2003/0190090 A1 | 10/2003 | Beeman et al. |
| 2007/0217701 A1 | 9/2007 | Liu et al. |
| 2007/0253040 A1 | 11/2007 | Lee et al. |
| 2007/0272753 A1 | 11/2007 | Scanlon |
| 2009/0060330 A1 | 3/2009 | Liu |
| 2009/0214109 A1 | 8/2009 | Nakashima et al. |
| 2011/0176736 A1 | 7/2011 | Davison et al. |

* cited by examiner

Raghuveer Kanneganti

Digital Image processing

Digital Signal Processing

Aoburn Hills

Pattern classification

Cnet

Media Labs

CTB

Monterey    Detroit, MI

Algorithm Developer

MIT

SYSTEMS AND METHODS FOR COMPUTATIONALLY DISTINGUISHING HANDWRITTEN PENCIL MARKS FROM PREPRINTED MARKS IN A SCANNED DOCUMENT

FIELD OF THE INVENTION

This invention relates to computational methods for discriminating graphite pencil marks from pre-printed background text and graphics, regardless of color, in an optical scan of a response form.

BACKGROUND OF INVENTION

Written surveys and assessments are routinely administered by providing users (respondents) with response sheets including pre-printed artwork and locations for the user to enter responses to survey questions or items presented in the assessment. Pre-printed artwork on a response sheet comprises matter printed on each sheet prior to distribution to the respondents and includes information not typically needed to evaluate the user's response(s). Pre-printed artwork may include alphanumeric text, such as survey or test identification information, response instructions, or survey or test questions, graphics (including charts, tables, graphs, and diagrams), graphic features (such as lines, borders, shading, and bubble targets (circles, ellipses, ovals, boxes), and letters or numbers within bubble targets. In the context of the present disclosure, a "bubble target" is defined as the printed circle (or ellipse, oval, box, or other closed shape), whether marked or not, on a response sheet, and "response bubble" is defined as the mark made by a person to fill the bubble target. The user enters marks by filling in, e.g., with a no. 2 lead (graphite) pencil, appropriate bubble targets (i.e., by making response bubbles) corresponding to a letter or number entered in a response box above the bubble target or corresponding to answer choices for one or more questions presented in the survey or test. The test sheets are then scanned, and the responses are evaluated automatically by applying a template or optical mark recognition (OMR) techniques to tally or assess each response based on the bubble target that has been filled in.

In the automated response evaluation process, the user marks must be separated from the pre-printed artwork on the response sheet, so the pre-printed artwork is "dropped out" to create a document including only the user response marks, and possibly other necessary information typically used in OMR processing (e.g., sheet identification marks, timing marks, and skew marks).

Conventionally, separating user response marks from background material, such as the pre-printed artwork, requires the use of an infrared scanner and non-carbon-bearing inks, so that the pre-printed artwork is not included in the scanned document image. Most colored inks used for the pre-printed background artwork are transparent to the wavelength of infrared scanners, while carbon absorbs the light. As a result, the background artwork vanishes, leaving only the graphite responses and other carbon-bearing marks. Thus, a test response sheet including pre-printed artwork and user response marks scanned with an infrared scanner will produce a document that includes only the user response marks (due to infrared light being sensitive only to carbon-bearing inks) and necessary pre-printed marks configured to be detected by an infrared scanner (e.g., sheet identification marks and timing marks). Then OMR is employed to evaluate only the user response marks without interference from the pre-printed artwork.

The necessity of using infrared scanners to separate user response marks from pre-printed artwork creates a number of disadvantages due in part to the high cost of infrared scanners. Infrared scanners are typically much more costly than conventional visible-light scanners ($\infty$$100,000). Exemplary OMR infrared scanners include the iNSIGHT™ 150 by Scantron. Further, the maintenance costs of infrared scanners are high. Infrared scanners are not commonly owned by scanning companies, schools, or other businesses that require scanning of response sheets. This limits or prevents collaborations with groups that do not own infrared scanners, prevents the use of hand-held scanning devices at the survey room or classroom level, and prevents local scanning at the response-collection sites using ordinary, inexpensive scanners.

Software configured to numerically drop out specific background color or color sets from a scanned document has existed from some time. For example, Dunord Technologies does this in its product called ColErase. Other companies, such as Hewlett-Packard and Kofax, also offer background drop-out as a way to increase accuracy of data capture from scanned forms. Existing color drop-out technology, however, requires that the pre-printed content to be dropped out be a different color than the response marks, and often it requires advance knowledge of which color(s) is (are) to be dropped out.

Accordingly, it would be desirable to have systems and processes for processing response forms in a manner that distinguishes the response marks from the pre-printed text and graphics (i.e., background) using standard scanners that are less expensive to purchase and maintain, and that does not require advance knowledge of the colors or shapes of the background elements to be dropped out.

SUMMARY OF INVENTION

The present invention systematically detects and isolates the graphite elements in scanned test documents with varying background colors and artwork. Aspects of the invention relate to methods, systems, apparatus, and software to detect graphite responses in scanned response forms, such as test documents, using inexpensive scanners. The graphite responses of interest are the penciled bubbles and the alphanumeric characters written by the respondent in OMR documents.

A test image is modeled as a superposition of a graphite image and the background image. The background image is further modeled as a superposition of several constituent components. The process is formulated in terms of background removal, and a sequence of operations is used to systematically identify and remove the background elements. This methodology can be applied to a wide range of response documents scanned using an ordinary visible-light scanner with results that are visually similar to those obtained using an infrared scanner.

In addition to dropping out the backgrounds for the purposes of OMR scanning, other uses for this invention may include the following. It will be apparent to one of ordinary skill in the art that these uses represent some, but not all, potential uses for this invention.

Optical character recognition (OCR). Boxes and artwork on forms which are decoded by OCR may prevent accurate decoding and, thus, need to be removed. Currently, this step is usually done using infrared scanners or dropout of a specific color. It is apparent that preknowledge of the particular color used in each form is required.

Handwriting recognition, sometimes referred to as intelligent character recognition (ICR). Handwriting recognition faces the same issues as OCR, and is further complicated by the fact that many handwriting responses or entries are not correctly placed in provided spaces, and incorrectly encroach on other artwork, boxes, or lines.

Handscoring (that is, scoring by human raters) of written responses to test questions or prompts, using images of scanned sheets displayed on computer monitors or similar display devices. (See, e.g., U.S. Pat. No. 5,987,149, David Poor, (Nov. 16, 1999); U.S. Pat. No. 7,054,464 (May 10, 2006); U.S. Pat. No. 6,466,683 (Oct. 15, 2002); and U.S. Pat. No. 6,256,399 (Jul. 3, 2001), the disclosures of which are hereby incorporated by reference.) In a typical electronic handscoring system, a written response may contain handwriting, artwork, and printed lines or other graphic features. In order to present the clearest possible image to the human rater, it is necessary that the rater be able, at individual discretion, to drop out the document background if it is obscuring the student response. This is currently done using expensive infrared scanners, which capture only the response, then juxtaposing it, if necessary, with the document background at the workstation.

Reduction of file size. Image files are large. This invention can be used to avoid the expense of redundantly storing the same document background again and again with each individual document created on a common form.

The detection of graphite responses through alternative methods is quite complex because there are hundreds of different types of optical mark recognition sheets which vary in background colors and artwork. Furthermore, optical mark recognition sheets may also be customized for specific needs. The graphite detection method described herein significantly reduces the cost by using an inexpensive color scanner (≈$75) in conjunction with a sequence of image processing operations and a pattern classification algorithm. The outputs of this method are similar to those produced by the infrared scanners typically used.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

FIG. 2 shows a scanner-generated image of graphite markings for identifying computationally detectable characteristics of graphite markings.

FIG. 3 shows a scanner-generated image of pre-printed, background markings for identifying computationally detectable characteristics of non-graphite markings.

DETAILED DESCRIPTION OF THE INVENTION

Image Model

The output of the inexpensive color scanner in response to a test optical mark recognition document is referred to as the "response image" and comprises a matrix of pixel values represented by the function F(x,y). The response image can be modeled as the sum of two constituent components: (1) the scanner response to the graphite, and (2) the scanner response to the blank optical mark recognition document which will be referred to as the background. If G(x,y) and N(x,y) are the graphite and background pixel elements, respectively, the response image is given by $$F(x,y)=G(x,y)+N(x,y). \quad (1)$$

Using this model, the objective is to determine G(x,y) given F(x,y). If N(x,y) is known and if F(x,y) and N(x,y) can be perfectly aligned, this problem could be easily solved by taking the difference between F(x,y) and N(x,y). In order to make the detection invariant to the numerous optical mark recognition backgrounds, it is assumed the blank optical mark recognition documents are not available, therefore, N(x,y) is assumed unknown. Furthermore, perfect alignment in practice is impossible; therefore, it is not assumed. The present invention systematically removes the background using a sequence of image processing and classification algorithms—i.e., algorithms for classifying elements of a response sheet as handwritten elements or preprinted elements. The formulations of these algorithms are described in the following sections.

Image Processing of the Response Image

Figure 1:
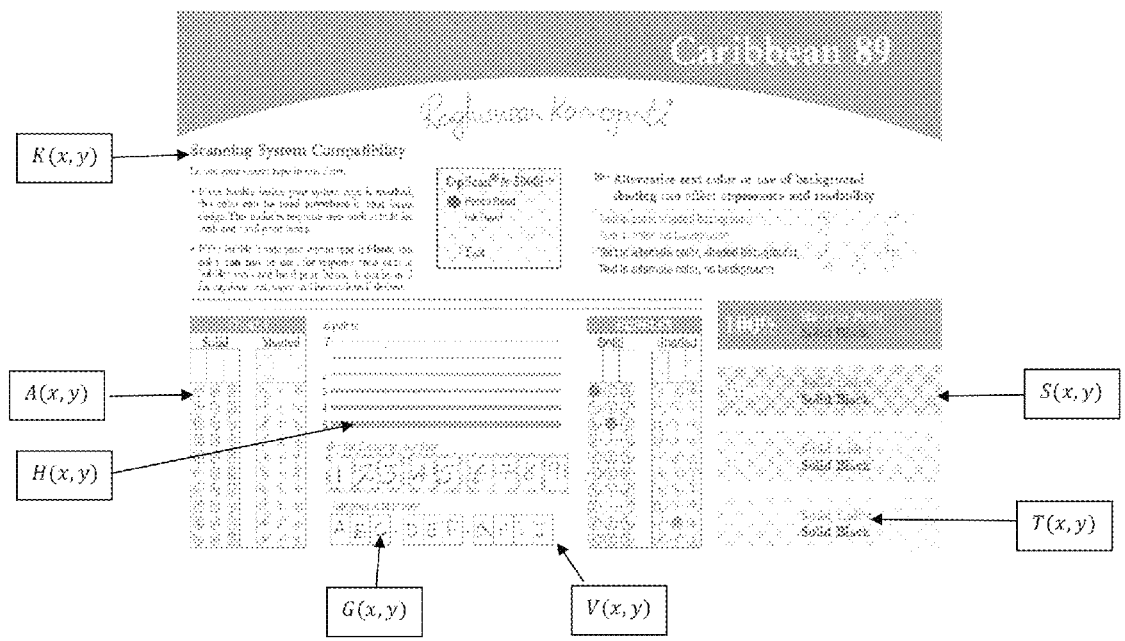
FIG. 1 shows constituent components of a typical scanner-generated response image.

Referring to FIG. 1, the background image N(x,y) can be decomposed into the black machine text K(x,y), colored machine text T(x,y), colored screening dot patterns S(x,y), colored artwork A(x,y), solid vertical lines V(x,y), and solid horizontal lines H(x,y). That is, $$N(x,y)=H(x,y)+V(x,y)+A(x,y)+S(x,y)+T(x,y)+K(x,y) \quad (2)$$

It will be apparent that the image may be a color image or a grayscale image. In the case of a grayscale image, the process of Color-based Segmentation described below cannot be done, but the other processes described below accomplish the background dropout.

Horizontal and Vertical Line Removal

The background elements vary from document to document depending on the colors used to design the document. In order to make the detection of these background elements invariant to background color, the color response image F(x, y) is converted into a grayscale image f(x,y) according to $$f(x, y) = \frac{1}{3}[F_R(x, y) + F_G(x, y) + F_B(x, y)] \quad (3)$$

where $F_R(x,y)$, $F_G(x,y)$, and $F_B(x,y)$, are the red, green, and blue background components of F(x,y), respectively. The pixels of the solid vertical and horizontal lines in f(x,y) can be detected by the colinearity Hough transform. Moreover, because the pixels of the dot screening patterns also form horizontal and vertical lines, they may also be detected by the Hough transform and then removed from the background. In order to apply the Hough transform, the grayscale image is converted into a binary image using the following thresholding rule:

$$g(x, y) = \begin{cases} 1, & \text{if } f(x, y) < \delta\{MAX[f(x, y)]\} \\ 0, & \text{otherwise} \end{cases} \quad (4)$$

The factor, $\delta$, $0<\delta<1$, can be determined empirically across a large number of response images. It is important to note that the segmentation threshold can, therefore, be determined autonomously because it is a function of the intensities of a given response. Let $A(\rho, \theta)$ be the colinearity Hough transform of $g(x,y)$ and let $\{A_{t_1}(\rho,0)\}$ and $\{A_{t_2}(\rho,\pm 90)\}$ be the sets of accumulator cells with counts exceeding $t_1$ and $t_2$, respectively. If $f_{t_1}(x,y)$ and $f_{t_2}(x,y)$ are the images formed by the pixels of $\{A_{t_1}(\rho,0)\}$ and $\{A_{t_2}(\rho,\pm 90)\}$, respectively, then the image given by $$\tilde{g}(x,y) = g(x,y) - f_{t_1}(x,y) - f_{t_2}(x,y) \quad (5)$$

will be free of horizontal and vertical line segments with more than $t_1$ and $t_2$ pixels, respectively. The reason for imposing thresholds $t_1$ and $t_2$ is to make sure that short horizontal and vertical line segments which may be parts of graphite characters are not removed. The values of $t_1$ and $t_2$ can be determined empirically across a large number of response images.

Color-Based Segmentation

In the next step, $\tilde{g}(x,y)$ is used as a mask for removing the horizontal and vertical lines in the original color image. This is accomplished by multiplying the color image $F(x,y)$ by the mask $\tilde{g}(x,y)$. That is, the resulting color image is given by $$\tilde{F}(x,y) = F(x,y)\tilde{g}(x,y) \quad (6)$$

$$= A(x,y) + T(x,y) + K(x,y) + G(x,y)$$

As noted earlier, optical mark recognition sheets come in numerous colors. Therefore, the color clusters of the background images vary widely in the RGB color space. However, the cluster of the graphite element is relatively invariant in the RGB color space. To some degree (depending on the background colors), the removal of the background elements can be made invariant to color by segmenting the graphite cluster in the RGB color space. The graphite pixels can be modeled as a (3×1) random vector Y whose density function is given by $$p(Y) = \frac{1}{(2\pi)^{3/2}|\Omega|^{1/2}} \exp\{(Y-m)^T \Omega^{-1}(Y-m)\} \quad (7)$$

where T denotes the transpose of a vector and m and $\Omega$ are the (3×1) and (3×3) mean and covariance matrices of Y, respectively. That is, the cluster is a hyper-ellipsoid. For this case, the major principal axis will be along the diagonal of the color cube which corresponds to the line connecting the coordinates (0, 0, 0) to the coordinates (255, 255, 255). The segmentation of the graphite cluster can, therefore, be expressed as $$\hat{F}(x, y) = \begin{cases} 1, & \text{if } \tilde{F}(x, y) < r^2 \\ 0, & \text{otherwise} \end{cases} \quad (8)$$

where $$r^2 = (Y-m)^T \Omega^{-1}(Y-m) \quad (9)$$

is the squared Mahalanobis distance between Y and m. Therefore, non-gray pixels are identified and set to 0, using Equation (8). The colored art elements and the black text elements of the background may or may not be partially removed in this step. In order for the formulation to be general, it is assumed that the segmented image is now $$\hat{F}(x,y) = \hat{A}(x,y) + \hat{T}(x,y) + \hat{K}(x,y) + G(x,y) \quad (10)$$

where $\hat{A}(x,y)$, $\hat{T}(x,y)$, and $\hat{T}(x,y)$ are the modified elements of $A(x,y)$, $T(x,y)$, and $K(x,y)$, respectively, due to color segmentation. The modified black machine text element $\hat{K}(x,y)$ is relatively dark and can be removed using intensity based segmentation. In order to do so, $\hat{F}(x,y)$ is converted into a grayscale image $\hat{g}(x,y)$ using Equation (3) and segmented according to $$h(x, y) = \begin{cases} \hat{g}(x, y), & \text{if } \hat{g}(x, y) > \beta \\ 0, & \text{otherwise} \end{cases} \quad (11)$$

where $\beta$ is an empirically determined threshold, thereby generating a grayscale image $h(x,y)$ with non-gray and near-black pixels set to zero. The grayscale image $h(x,y)$ may now be expressed as $$h(x,y) = h_A(x,y) + h_T(x,y) + h_G(x,y) \quad (12)$$

Where $h_A(x,y)$, $h_T(x,y)$, and $h_G(x,y)$ are the grayscale components corresponding to $A(x,y)$, $T(x,y)$, and $G(x,y)$, respectively.

Classification of Elements

Due to the overlap of the clusters in $h(x,y)$, the removal of $h_A(x,y)$ and $h_T(x,y)$ directly using image processing algorithms is not possible, therefore, the elements of $h(x,y)$ are separated using a texture recognition approach. Texture is chosen because the graphite element is expected to have a coarser texture when compared with the other two machine-printed elements. Furthermore, texture carries over from the color domain to the grayscale domain thus simplifying the detection of texture in one grayscale image rather than in three (red, green, and blue) images. Therefore, $h(x,y)$ is considered to be an image containing objects belonging to two classes, $\omega_1$ (graphite) and $\omega_2$ (non-graphite). The texture features are selected according to the following criteria: they must be invariant to the object (a) shape, because the objects within each class have varying shapes, and (b) size, because the objects within a class have varying dimensions. Before classifying the elements the zero matrix of the same size as the response image is created $$M(x,y) = 0 \quad (12)$$

In order to satisfy these requirements, texture features are derived from the normalized histograms of the objects because the normalized histogram, represented by $p(z_i)$, $i=1, 2, \ldots, 255$, is invariant to the shape and size of the objects. The following features are selected:

Entropy $$e(z) = -\Sigma_{i=0}^{L-1} p(z_i) \log_2 p(z_i) \quad (13)$$

Skewness $$\mu_3(z)=\Sigma_{i=0}^{L-1}(z_i-m)^3 p(z_i) \quad (14)$$

Uniformity $$U(z)=\Sigma_{i=0}^{L-1} p^2(z_i) \quad (15)$$

Using the above feature set, a three-dimensional multivariate classifier whose discriminant function is given by $$d_i(Z) = \ln P(\omega_i) - \frac{1}{2}\ln|\varepsilon_i| - \frac{1}{2}[(Z-\mu_i)^T \varepsilon_i^{-1}(Z-\mu_i)], i = 1, 2 \quad (16)$$

is designed to separate the two classes. The parameters $\mu_i$ and $\epsilon_i$ are the (3×1) mean vector and (3×3) covariance matrices, respectively, of the classes labeled $\omega_1$ and $\omega_2$, respectively. $P(\omega_i)$ is the prior probability of class $\omega_i$, i=1,2. A test object represented by a vector Z* is assigned to class $\omega$* given by $$\omega^*=\arg_i^{max}[d_i(Z^*)]. \quad (17)$$

If $\omega$* is identified as a graphite class for a given test element feature set Z, the corresponding pixel locations in M(x,y) are changed to intensity value 1. This creates a binary image where all the pencil marks that were identified from the response sheet using the developed process are set to 1 and the rest of the pixels are set to 0.

Once all the elements are tested, each pixel of the binary mask M(x,y) is multiplied with the corresponding pixel of the grayscale image of the response sheet f(x,y), thus creating a grayscale image GS(x,y) with all the background as intensity 0 and identified pencil marks (i.e., graphite elements) with their own intensities.

$$GS(x,y)=M(x,y)f(x,y) \quad (18)$$

All the 0 intensities (which are labeled as background) that are in GS(x,y) are changed to intensity 220, corresponding to a light gray which is similar to the color of white paper. It is also important to be noted that the intensity value 220 is arbitrary and any intensity value can be used to label the background.

It will be apparent to one of ordinary skill in the art that other features may be more useful in different circumstances. Suitable features may include, but are not limited to:

Mean $$\mu = \frac{\sum X}{N}$$

Standard Deviation $$\sigma = \sqrt{\frac{1}{N}\sum_{i=1}^{N}(x_i-\mu)^2}$$

Smoothness $$S(z) = 1 - \frac{1}{1+\sigma^2(z)}$$

Kurtosis $$K(z) = \sum_{i=0}^{L-1}(z_i-m)^3 p(z_i)$$

Root Mean Square (RMS)

$$X_{RMS} = \sqrt{\frac{1}{N}\sum_{n=1}^{N}|X_n|^2}$$

Variance $$\sigma^2 = \frac{1}{N}\sum_{i=1}^{N}(x_i-\mu)^2$$

Median Absolute Deviation $$MAD=median_i(|X_i-median_j(X_j)|)$$

Range $$R(X)=Max(X)-Min(X)$$

Interquartile Range $$IQR=Q3-Q1$$

Validation of the Process

The graphite detection procedure can be used on a wide range of optical mark recognition sheets with different background colors and artwork. Each sheet can have penciled bubbles and penciled characters written by different individuals using different graphite pencils. In one example, the spatial resolution of the scanner is set to 300 dots per inch. The information required to estimate the color segmentation parameters (m and $\Omega$) and the classifier parameters ($P(\omega_i)$, $\mu_i$, and $\epsilon_i$)) is extracted from representative classification sets of the graphite and non-graphite classes. In the present invention, computationally-detectable characteristics or features of markings on a scanned response sheet image are used to distinguish certain types of markings (e.g., hand-written graphite markings) from other types of markings (e.g., pre-printed background markings). Thus, sheets containing a set of markings known to be of one particular type (e.g., only hand-written graphite markings or only pre-printed background markings), referred to herein as "classification sets," are scanned and the methodology of the present invention is used to identify the computationally-detectable characteristics or features of those markings so that those characteristics or features can later be recalled and used to identify a particular type of marking among other markings in a scanned image of a response sheet that includes more than one type of marking.

The software creates a set of characteristics, or features, benchmarks, or sample sets, against which each document is automatically evaluated. A graphite classification set is generated by a thresholding process that rejects the background color of the sheet and keeps only the graphite marks, based on a predetermined thresholds of red, green, and blue (RGB) pixel values, from a scanned image of a white sheet 60 with penciled characters (see FIG. 2), which represents the classification set for graphite, handwritten marks. In this example, the threshold intensity is based on a value of 230 out of a possible 255 for all three color channels. The classification set used for color segmentation is the red, green, and blue pixel values of graphite pixels, from which mean and covariance are computed.

Figure 3:
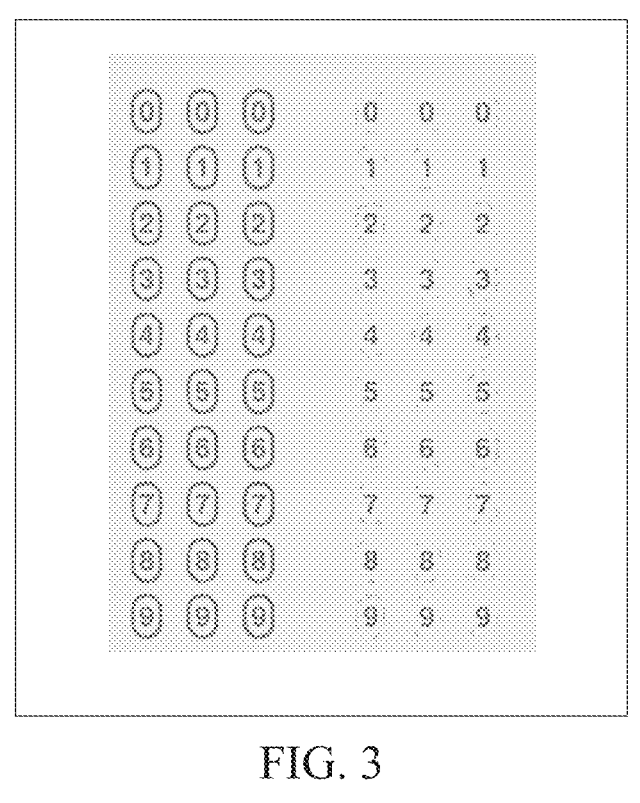

The classification sets used for the texture classifier may be the entropy, skewness, and uniformity of graphite and non-graphite image elements, from which mean and covariance are computed. In this example, pixels of the scanned optical mark recognition sheet 62, shown in FIG. 3, are selected to form the classification set of the non-graphite class. The segmentation factor, δ, is selected to be 0.95 and the Hough transform—related thresholds $t_1$ and $t_2$ were both set to 75. The color segmentation threshold $r^2$ is set as the smallest value that encompasses 100 percent of the graphite classification set cluster.

Figure 9:
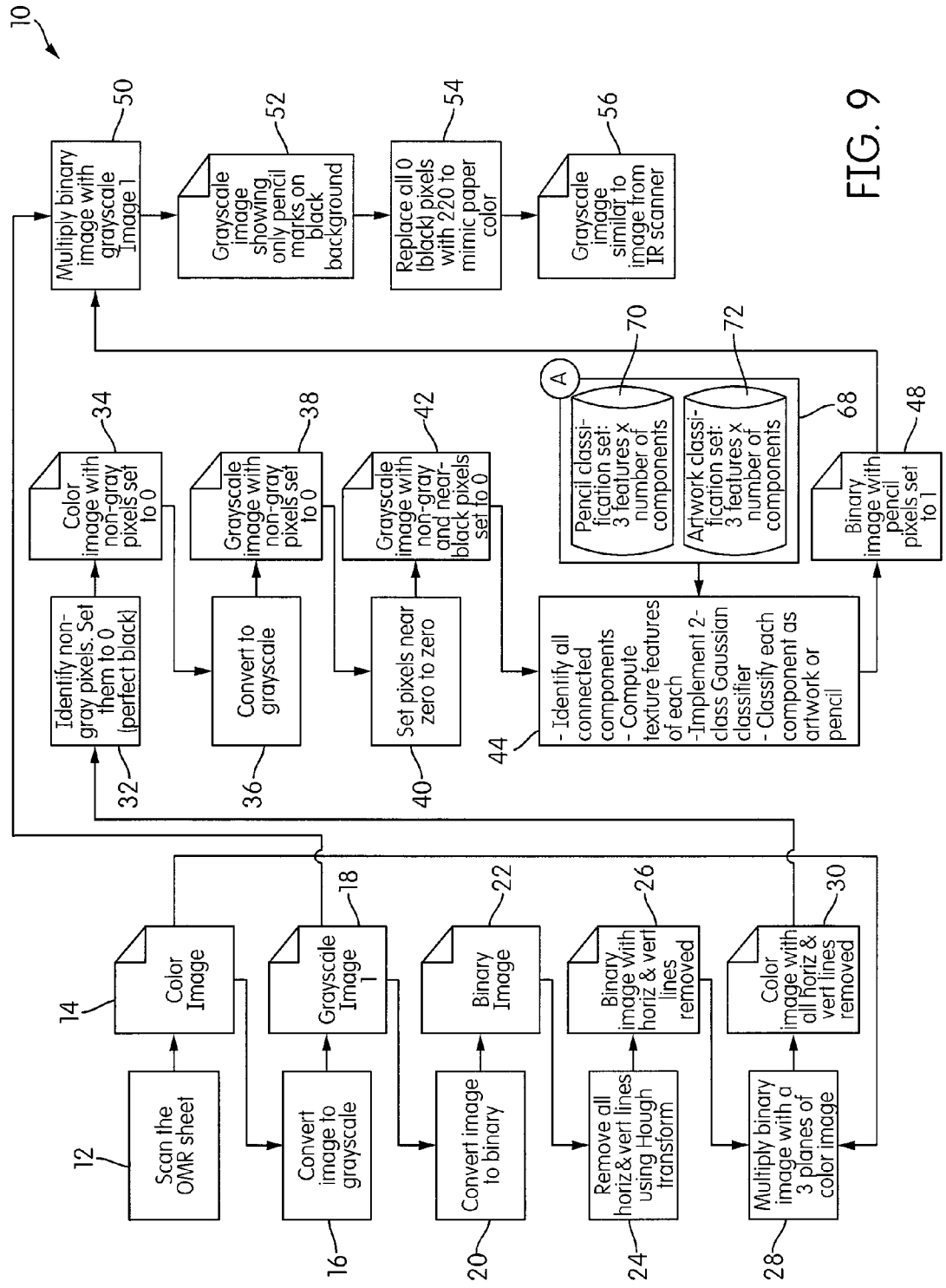
FIG. 9 illustrates the relationship of classification sets to documents.

FIG. 9 is a schematic illustration of the process for generating classification sets. Starting with a scanned image of a sheet of elements handwritten in graphite (i.e., markings), represented by reference number 60, connected pixel groups of the scanned image are identified, and textural features of each connected pixel group are computed, as represented at step 64. A connected pixel group is defined as a group of pixels that are touching (immediately adjacent to) each other and whose intensities are within a predefined intensity threshold value, such as would be the image of a contiguous alphanumeric character or graphic element. In this context the threshold value calculation is defined in Equation (4) as δ{MAX[f(x,y)]}. The textural features may be the entropy, skewness, and/or uniformity of the data set as determined using Equations (13), (14), and/or (15) above, although other features, including those listed above, may be suitable as well. Similarly, starting with a scanned image of a sheet of background information as represented by reference number 62, textural features are computed for each connected pixel group as represented at step 66. Again, the textural feature may be computed using Equations (13), (14), and/or (15) above, or additional or different features may be computed. The results of Step 64 and 66 is a classification set 68 that comprises the different classifications of markings to be distinguished from each other. In the illustrated embodiment, the classification set 68 may comprise a pencil, or graphite, classification set 70, which may comprise three (or more) features multiplied by the number of connected pixel groups in the original classification set. The classification set 68 may further include an artwork, or background, classification set 72, which may comprise three (or more) features multiplied by the number of connected pixel groups in the original background classification set.

A process for implementing the invention is represented by flow chart 10 in FIG. 9. In Step 12 the response sheet, referred to as the "OMR sheet," is scanned using a conventional scanner, thereby forming a color image 14 mathematically represented by Equation (1). In Step 16, the scanned color image 14 is converted to grayscale according to Equation (3), thereby generating a grayscale image 18 of the OMR sheet.

In Step 20, the grayscale image 18 is converted to a binary image using Equation (4), thereby forming a binary image 22 of the OMR sheet.

In Step 24, the horizontal and vertical lines of the binary image 22 are detected and removed using the Hough transform, Equation (5), thereby generating a binary image with horizontal and vertical lines removed 26.

In Step 28, the binary image 26 is multiplied with three planes of color image, thereby generating a color image 30 with all horizontal and vertical lines removed, as described above in the discussion regarding Equation (6).

In Step 32, non-gray pixels are identified, and are set to zero, thereby generating a color image with non-gray pixels set to zero 34, as described above in the discussion regarding Equations (7) and (8).

In Step 36, the color image with non-gray pixels set to zero 34 is converted to grayscale using Equation (3), thereby generating the grayscale image with non-gray pixels set to zero 38.

In Step 40 all pixels that are near zero are set to zero using Equation (11), thereby generating a grayscale image with non-gray and near-black pixels set to zero 42, as described above in the discussion regarding Equations (10) through (12).

Figure 8:
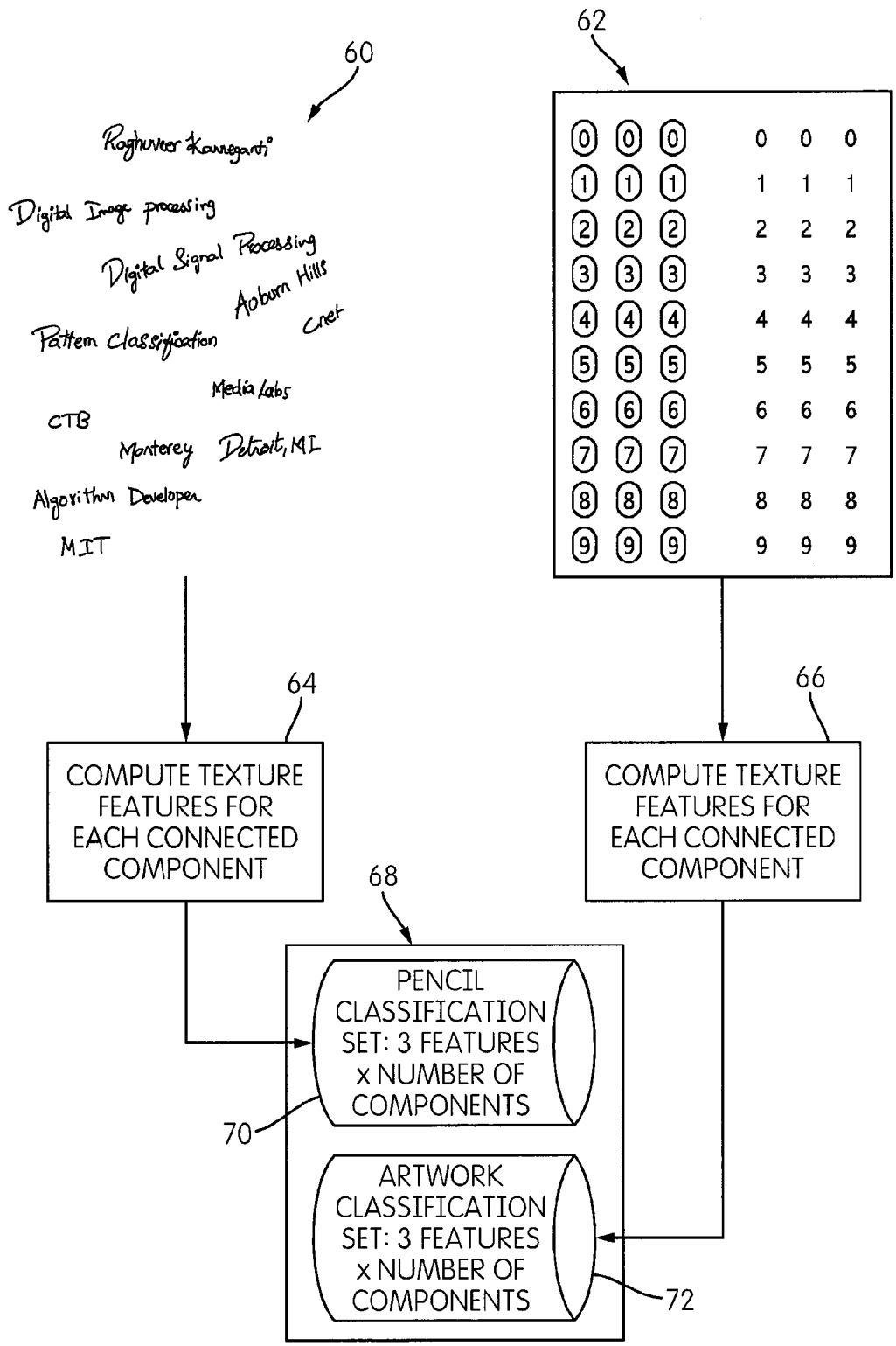
FIG. 8 is a flowchart showing a process embodying aspects of the invention.

Step 44 includes four sub-steps. In a first sub-step, all connected pixel groups are identified. In a second sub-step, textural features of each connected pixel group are computed using, for example, Equations (13), (14), and (15)—that is, using the same textural features that are computed for the classification sets. In a third sub-step, a two-class Gaussian classifier is implemented comparing the textural features computed for the OMR sheet with the pencil and artwork classification sets at 68 (see also FIG. 8). In a fourth sub-step, each connected pixel group of the OMR sheet is identified as artwork (background) or pencil (graphite).

In Step 48, the binary image with pencil (graphite) pixels is set to one, as described above.

In Step 50, the binary image is multiplied with the grayscale image 1, as described above in the discussion regarding Equation (18). This results in a grayscale image 52 showing only pencil marks on a black background 52.

In Step 54 all zero (black) pixels are replaced with the value 220 to mimic paper color, as described above. This results in grayscale image 56 that is similar to an image generated by an infrared scanner. The image file can be utilized in computer memory during the same process, or it can be saved as an image file for later use and/or processing.

Figure 4:
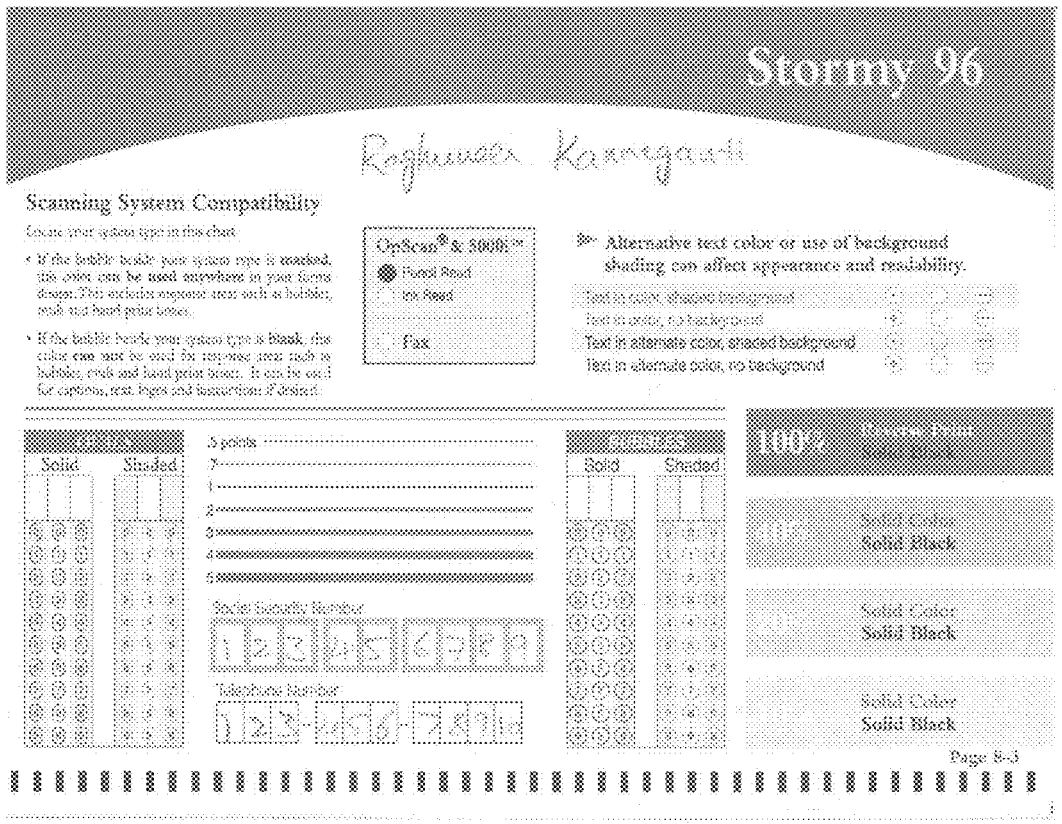
FIG. 4 shows a scanner-generated image of a response sheet with graphite response markings.
Figure 5:
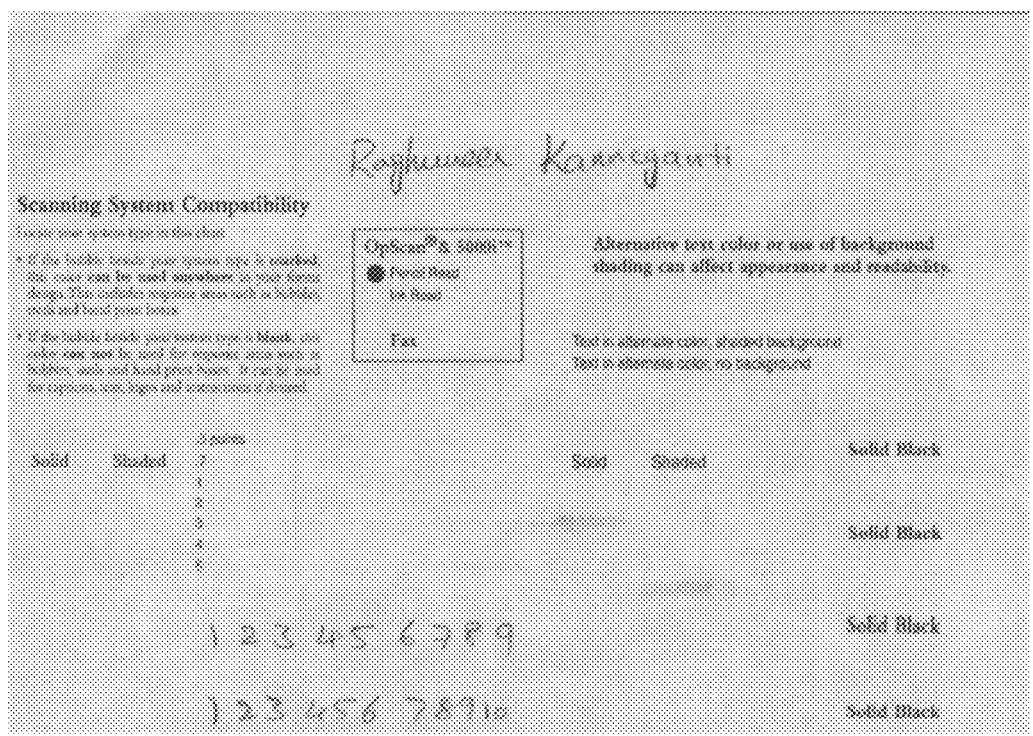
FIG. 5 shows an image of the response sheet shown in FIG. 4 generated by an infrared scanner isolating the graphite markings and certain pre-printed background markings from other pre-printed background markings.
Figure 6:
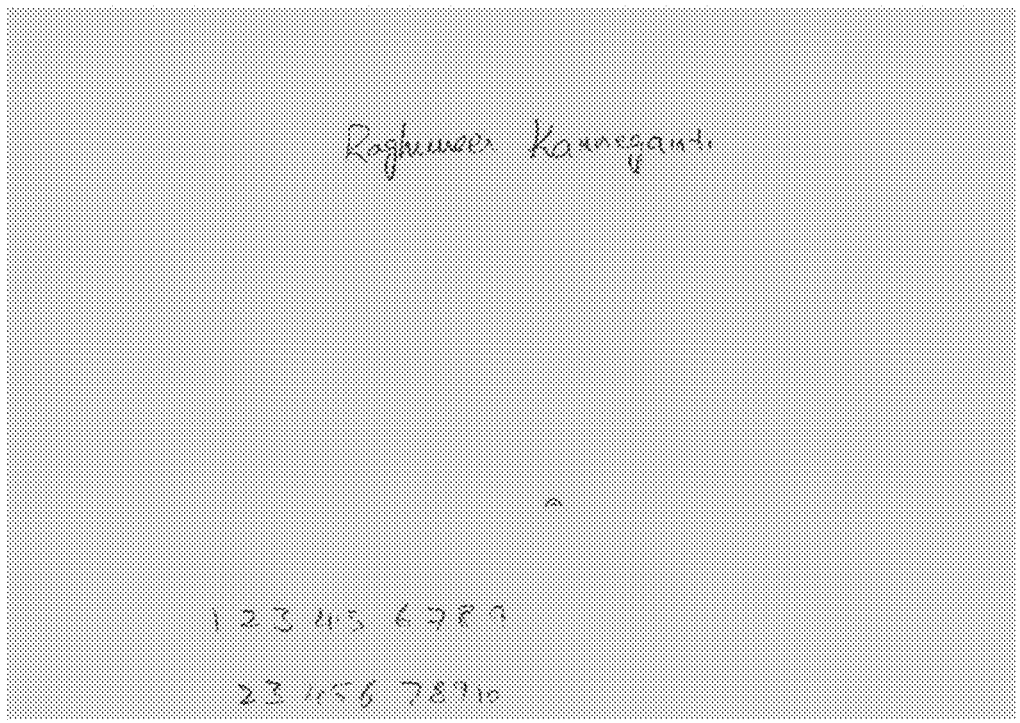
FIG. 6 shows graphite response markings of the response sheet shown in FIG. 4, wherein the graphite markings have been isolated and extracted from the image in accordance with aspects of the present invention.

The results clearly show that the output images created by this process and output images created by an infrared scanner are quite similar (see FIGS. 4 to 6). FIG. 4 shows the original, scanner-generated image of a response sheet including background marks and graphite response markings FIG. 5 shows an image of the response sheet shown in FIG. 4 generated by an infrared scanner isolating the graphite markings and certain pre-printed background markings from other pre-printed background markings. The response sheet that was scanned for FIG. 5 included some background art printed in carbon-based ink, and thus some of that background was picked up by the infrared scanner. For response sheets printed with non-carbon-based inks, only the graphite markings would have been picked up by the infrared scanner. FIG. 6 shows graphite response markings of the response sheet shown in FIG. 4, wherein the graphite markings have been isolated and extracted from the image in accordance with the process described above. A comparison of FIGS. 5 and 6 confirms the accuracy of the method.

These results are typical of the results obtained for other test sheets. Note that text printed in carbon-bearing ink remains in the infrared-scanned image, as shown in FIG. 5, while the process used in the present invention removes this text from the output image, as shown in FIG. 6.

Objective Evaluations

For this case, the data set consisted of simulated response images generated by the following model:

$$F(x,y)=G(x,y)+N(x,y)+\eta(x,y)$$

where $G(x,y)$ is the graphite image, $N(x,y)$ is the background (blank optical mark recognition) image, and $\eta(x,y)$ is the noise introduced during scanning. The scanning noise component is included to account for the typical variations that occur when a given image is scanned repeatedly. That is, each pixel at a given location varies randomly from scan to scan. The scanning noise is assumed to be zero-mean Gaussian with variance $\sigma^2$. A specific response $F_i(x,y)$ is given by $$F_i(x,y)=G(x,y)+\alpha_i F_R(x,y)+\beta_i F_G(x,y)+\gamma_i F_{GB}(x,y)+\eta(x,y)$$

where $$\alpha_i, 0 \le \alpha_i \le \left(\frac{255}{m_r}\right); \beta_i, 0 \le \beta_i \le \left(\frac{255}{m_g}\right); \text{and } \gamma_i, 0 \le \gamma_i \le \left(\frac{255}{m_b}\right)$$

are the coefficients that determine the color of the resulting background image. The maximum values of the red, green, and blue component images of $N(x,y)$ are represented by $m_r$, $m_g$, and $m_b$, respectively.

For the experiments, the simulated responses were generated using the following sequence of steps:

(i) One blank optical mark recognition sheet was selected and scanned. This gave the image $N(x,y)$.

(ii) A small smooth region of constant intensity in $N(x,y)$ was chosen and the variance of the pixels in this region was estimated. This estimate was used for the scanning noise variance $\sigma^2$.

(iii) Ten individuals with different pencils wrote and filled bubbles in various parts of the selected optical mark recognition sheet and the resulting penciled sheet was scanned. The image $N(x,y)$ was manually aligned and subtracted from the penciled sheet image to obtain $G(x,y)$. The image $G(x,y)$ was examined and any errors due to misalignment were corrected manually.

(iiiv) A simulated response image was obtained by changing the color coefficients of $N(x,y)$ randomly, adding Gaussian noise with zero mean and variance $\sigma^2$, and adding the graphite image $G(x,y)$ to the result.

It should be noted that numerous response images with a multitude of background colors can be generated using the method outlined above. Another advantage is the fact that a single image $G(x,y)$ encompasses the writings of several individuals using different pencils. The noise introduced by different scanners can also be accommodated by changing the variance. Most importantly, the performance of the graphite detection methodology can be evaluated objectively over a large number of response images.

The two types of detection errors that can occur are (a) (b/g): a graphite pixel misclassified as a background pixel, and (b) (g/b): a background pixel misclassified as a graphite pixel. Therefore, for a given response image, the detection error probability can be determined from $$P(E)=P(b/g)P(g)+P(g/b)P(b).$$

The prior probabilities $P(g)$ and $P(b)$ of the graphite and background pixels can be estimated from a response image as $$P(g) = \frac{\text{number of graphite pixels}}{\text{total number of pixels}}$$

$$P(b)=1-P(g)$$

The detection results can be used to estimate the error probabilities as $$P(b/g) = \frac{\text{number of misclassified graphite pixels}}{\text{total number of graphite pixels}}$$

$$P(g/b) = \frac{\text{number of misclassified background pixels}}{\text{total number of background pixels}}$$

Figure 7:
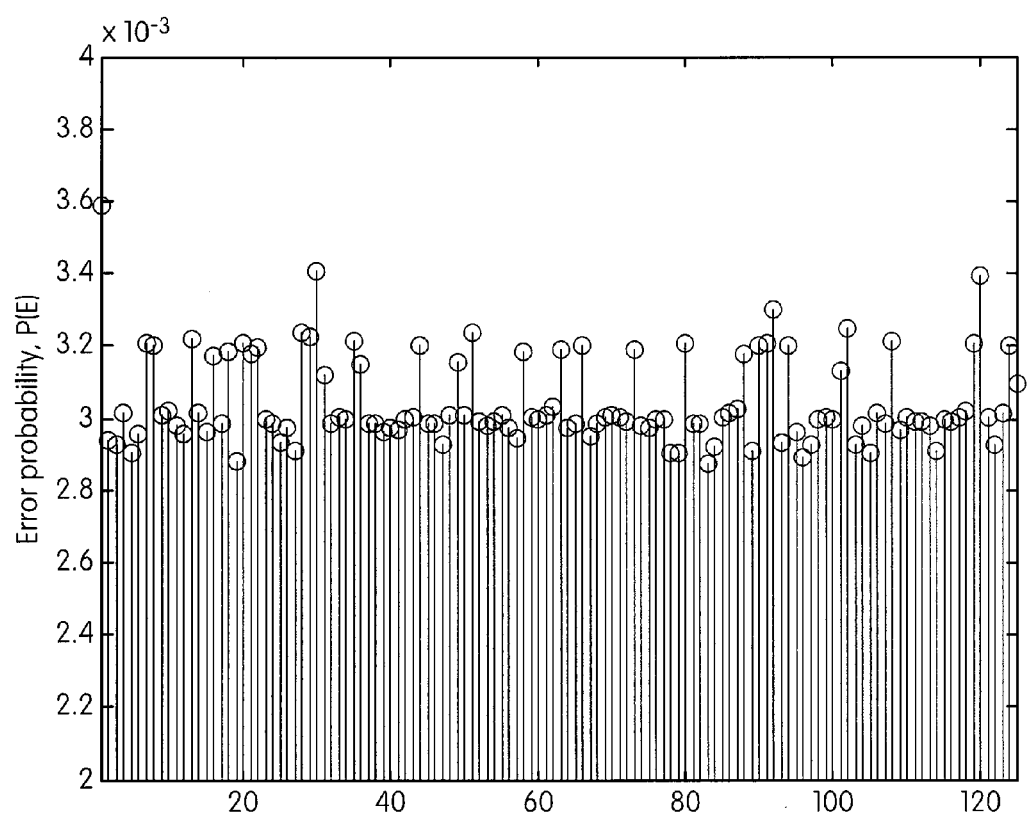
FIG. 7 shows detection error probabilities of 125 simulated response images.

For the detection experiments, the graphite classification set, the segmentation factor, and the Hough transform thresholds were the same as those used in the subjective evaluation experiments. Error probabilities of such magnitudes show very little visual difference between the detected outputs and the graphite image. FIG. 7 shows the detection error probabilities of 125 simulated response images. Each notch on the horizontal axis represents a test response image and the vertical axis shows the detection error probabilities. The average error across all 125 response images was 0.00304.

Figure 10:
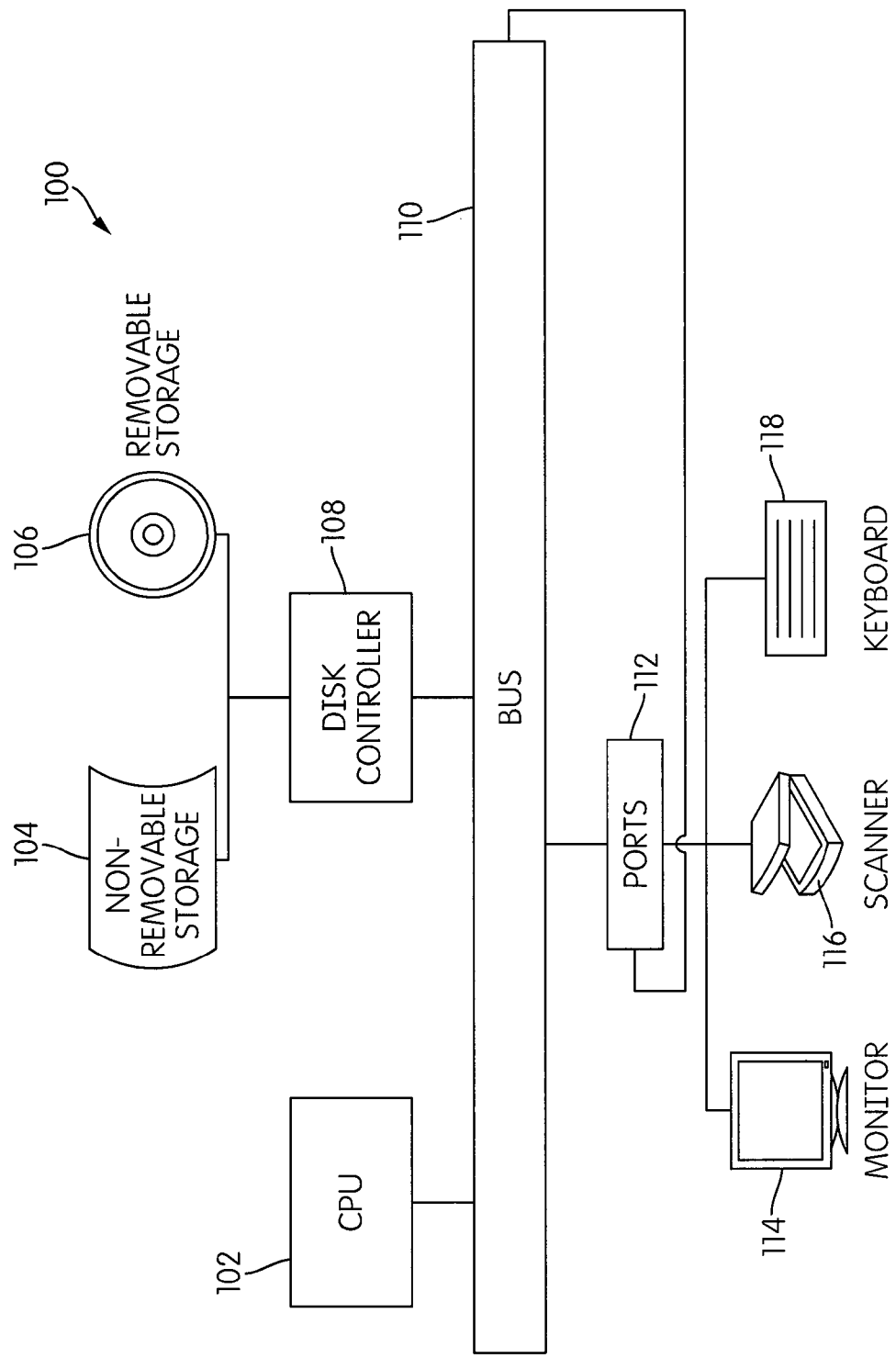
FIG. 10 is a schematic view of an exemplary system for implementing the present invention.

Aspects of the invention are implemented via computing hardware components, user-created software, data storage components, data input components, and data output components. As shown in FIG. 10, a system 100 for implementing the invention includes hardware components such as computing and control modules 102, for example microprocessors and computers, configured to effect computational and/or control steps by receiving one or more input values, executing software that comprises one or more algorithms (e.g., the algorithm shown in FIG. 9 and the equations described above) that provide instruction for manipulating or otherwise acting on the input values and data and output one or more output values. Such software may be stored on non-transitory machine-readable media—which may comprise non-removable storage 104, removable storage 106, a disc controller 108, as well as Internet or cloud-based storage, or any storage media now known or later developed. Such outputs may be displayed or otherwise indicated to a user for providing information to the user, for example, information as to the status of the instrument or a process being performed thereby, or such outputs may comprise inputs to other processes and/or control algorithms. In addition, outputs may be stored to the storage media 104 and/or 106. Data input components comprises elements by which data is input for use by the control and computing hardware components. Such data inputs may comprise manual input elements, such as keyboards 118, touchscreens, microphones, switches, sensors, manually operated scanners, etc., as well as machine input devices, such as scanners 114 for scanning OMR sheets. Data output components may comprise hard drives or other storage media (e.g., 104 and/or 106), monitors 114, or printers. The various components of the system 100 may communicate (e.g., exchange signals, data, and/or power) via a bus 110 or other means now known or later developed.

Software comprises instructions stored on non-transitory computer-readable media, such as instructions implementing process 10 of FIG. 9, which, when executed by the control and computing hardware 100, cause the control and computing hardware to perform one or more automated or semi-automated processes embodying aspects of the invention. One suitable programming language for implementing the methodology described herein includes MATLAB, available from Mathworks, Inc., using the Windows XP operating system available from Microsoft, although the methodology could be implemented using any platform with any programming language that has good support for matrix mathematics, image processing, and signals processing.

While the present invention has been described and shown in considerable detail with reference to certain illustrative embodiments, including various combinations and sub-combinations of features, those skilled in the art will readily appreciate other embodiments and variations and modifications thereof as encompassed within the scope of the present invention. Moreover, the descriptions of such embodiments, combinations, and sub-combinations is not intended to convey that the invention requires features or combinations of features other than those expressly recited in the claims. Accordingly, the present invention is deemed to include all modifications and variations encompassed within the spirit and scope of the following appended claims.

The invention claimed is:

1. A method for computationally distinguishing hand-written marks from pre-printed artwork in a response sheet marked with pre-printed elements and hand-written elements, comprising:
   scanning a sheet containing only pre-printed elements to generate a first classification pixel file;
   identifying one or more connected pixel groups from data corresponding to the first classification pixel file;
   computationally detecting one or more features of the connected pixel groups of the first classification pixel file, and storing the detected features of the connected pixel groups of the first classification pixel file as a first classification set;
   scanning a sheet containing only hand-written elements to generate a second classification pixel file;
   identifying one or more connected pixel groups from data corresponding to the second classification pixel file;
   computationally detecting one or more features of the connected pixel groups of the second classification pixel file, and storing the detected features of the connected pixel groups of the second classification pixel file, as a second classification set;
   scanning the response sheet marked with pre-printed components and hand-written components to generate a response pixel file;
   identifying one or more connected pixel groups from data corresponding to the response pixel file;
   for each connected pixel group of the response pixel file, computationally detecting from data corresponding to the response pixel file one or more features of the connected pixel group; and
   computationally determining if the connected pixel group of the response pixel file corresponds to a pre-printed element or a hand-written element by comparing the features detected from the response pixel file with the features stored in the first classification set and the features stored in the second classification set.

2. The method of claim 1, wherein the detected features of the first classification set, the detected features of the second classification set, and the detected features of the response pixel file comprise one or more textural features selected from the group comprising: entropy, skewness, uniformity, mean, standard deviation, smoothness, kurtosis, root mean square, variance, median absolute deviation, range, and interquartile range.

3. The method of claim 1, further comprising the step of computationally removing data values corresponding to vertical and horizontal lines from the response pixel file.

4. The method of claim 3, wherein the step of computationally removing data values corresponding to vertical and horizontal lines from the response pixel file comprises applying a Hough transform to the values of the response pixel file.

5. The method of claim 1, further comprising the step of converting the response pixel file to a grayscale image.

6. The method of claim 1, further comprising, after determining if the connected pixel groups of the response pixel file corresponds to a pre-printed component or a hand-written component, suppressing the connected pixel groups corresponding to pre-printed components and storing, printing, or displaying only connected pixel groups corresponding to the hand-written components.

7. The method of claim 1, wherein the method is invariant of the color or colors of the pre-printed elements.

8. A system for computationally distinguishing hand-written marks from pre-printed marks in a response sheet marked with pre-printed elements and hand-written elements, comprising:
   storage media configured for storing data corresponding to one or more pixel files, said storage media storing:
      a first classification set comprising computationally-detected features of connected pixel groups of data corresponding to a first classification pixel file generated by scanning a sheet containing only pre-printed components; and
      a second classification set comprising computationally-detected features of connected pixel groups of data corresponding to a second classification pixel file generated by scanning a sheet containing only hand-written components; and
   an element determination module comprising a computer configured to computationally detect features from connected pixel groups of data corresponding to a response pixel file generated by scanning a response sheet marked with pre-printed elements and hand-written elements and to compare computationally detected features of a scanned response sheet with features of the first classification set and features of the second classification set to determine if connected pixel groups of the scanned response sheet correspond to pre-printed elements or hand-written elements.

9. The system of claim 8, further comprising a scanner for scanning sheets containing pre-printed marks and/or hand-written marks and generating a pixel file for the scanned sheet.

10. The system of claim 8, wherein the features detected from the connected pixel groups of the response pixel file comprise one or more textural features selected from the group comprising: entropy, skewness, uniformity, mean, standard deviation, smoothness, kurtosis, root mean square, variance, median absolute deviation, range, and interquartile range.

11. The system of claim 8, further comprising a computer configured to computationally remove data values corresponding to vertical and horizontal lines from the response pixel file.

12. The system of claim 11, wherein the computer is configured to computationally remove data values corresponding to vertical and horizontal lines from the response pixel file by applying a Hough transform to the values of the response pixel file.

13. The system of claim 8, further comprising a computer configured to convert the response pixel file to a grayscale image.

14. The system of claim 8, further comprising a computer configured to suppress connected pixel groups corresponding to the pre-printed elements of the response sheet and to store, print, or display only connected pixel groups corresponding to the hand-written elements of the response sheet.

15. The system of claim 8, wherein the element determination module is configured to determine if connected pixel elements of the scanned response sheet correspond to pre-printed elements or hand-written elements without regard to the color or colors of the pre-printed elements.

* * * * *